United States Patent [19]

Bonnet

[11] Patent Number: 5,685,416
[45] Date of Patent: Nov. 11, 1997

[54] MATERIAL CONVEYING APPARATUS AND METHOD

[75] Inventor: Henri Bonnet, Atlanta, Ga.

[73] Assignee: United Parcel Service of America, Inc., Atlanta, Ga.

[21] Appl. No.: 683,802

[22] Filed: Jul. 19, 1996

Related U.S. Application Data

[63] Continuation of Ser. No. 387,465, Feb. 13, 1995, abandoned.

[51] Int. Cl.$^6$ .............................. B65G 21/14; B65G 67/08
[52] U.S. Cl. ........................ 198/812; 414/390; 414/398
[58] Field of Search .............................. 198/812, 549; 414/390, 392, 393, 398

[56] References Cited

U.S. PATENT DOCUMENTS

| | | |
|---|---|---|
| 2,919,013 | 12/1959 | Culpepper . |
| 3,006,454 | 10/1961 | Penn . |
| 3,228,516 | 1/1966 | Sheehan ............................ 198/303 |
| 3,596,785 | 8/1971 | Weatherford, Jr. . |
| 3,788,452 | 1/1974 | McWilliams ....................... 198/812 |
| 3,835,980 | 9/1974 | Brooks, Jr. . |
| 3,885,682 | 5/1975 | McWilliams . |
| 4,474,287 | 10/1984 | Thompson ........................... 198/812 |
| 4,771,880 | 9/1988 | Mraz ................................... 198/812 |
| 4,869,358 | 9/1989 | Chandler ......................... 198/812 X |
| 5,046,603 | 9/1991 | Odenthal ............................. 198/812 |
| 5,256,021 | 10/1993 | Wolf et al. ...................... 198/812 X |
| 5,351,809 | 10/1994 | Gilmore et al. .................... 198/812 |

FOREIGN PATENT DOCUMENTS

| | | |
|---|---|---|
| 3340322 | 11/1983 | Germany . |
| 1680596 | 9/1991 | U.S.S.R. . |

*Primary Examiner*—F. J. Bartuska
*Attorney, Agent, or Firm*—Jones & Askew, LLP

[57] ABSTRACT

An extendible conveyor for conveying material to be loaded or unloaded from a trailer includes a telescoping boom supporting an endless conveyor belt for rotation about the telescoping boom at any extension length. A belt take-up is provided external to the telescoping boom for releasing or taking-up excess belt corresponding to the movement of the telescoping boom. A belt tension control arrangement which includes a control circuit and an extension sensor is provided to coordinate the release or take-up of excess conveyor belt corresponding to the telescoping boom movement while maintaining the conveyor belt at a desired belt tension. The extendible conveyor is pivotally supported for accommodating varying trailer bed heights and material loading conditions.

22 Claims, 4 Drawing Sheets

MATERIAL CONVEYING APPARATUS AND METHOD

This is a continuation of application Ser. No. 08/387,465 filed on Feb. 13, 1995 now abandoned.

TECHNICAL FIELD

This invention relates to a material conveying apparatus and method and, more particularly, to an extendible conveyor for transporting material from a material source to a material destination.

BACKGROUND OF THE INVENTION

Material conveying apparatuses, particularly those employing an endless flexible belt supported between end rollers of an elongated planar conveyor beam, are well known in the art. These conveyors are typically deployed for assisting the transporting of material from a source of material to a destination. The source of material may be located adjacent to an end of the conveyor or the source of material may be located along the length of the conveyor such as is well known in assembly line operations.

Endless belt conveyors are often used for loading and unloading trucks and trailers at loading docks. Trailers pulled by tractors typically comprise a rectangular enclosure having an open end which is closable by a set of hinged, side swinging doors or a retractable overhead door. A trailer containing material to be unloaded or an empty trailer waiting to be loaded with material is typically backed up to a loading dock so that the open end is adjacent the loading dock.

Fixed length conveyors may be used for loading and unloading trailers. Where a loaded trailer is to be unloaded, one end of the conveyor is positioned adjacent the material residing in the trailer, initially just outside of the open end of the trailer. As material is removed from the trailer the depth of the next items to be unloaded regresses into the trailer at an increasing distance from the end of the conveyor. Personnel placing the material from inside the trailer onto the conveyor must walk increasingly greater distances from the material to the conveyor. Similar problems are encountered when the trailer is being loaded. Material loaded into the trailer is loaded first toward the back of the trailer and the material loading depth progresses toward the opening as the loading proceeds.

Extendible conveyors have been in use to accommodate the variable material loading or unloading depth of material loaded in a trailer. Examples of prior extendible conveyors are shown in U.S. Pat. Nos. 3,885,682 to McWilliams, 3,596,785 to Weatherford, 3,006,454 to Penn and in Russian Patent No. 1,680,596 which are incorporated herein by reference. One type may comprise a fixed conveyor mounted on the loading dock, and a cooperating movable conveyor overlaying the fixed conveyor and supported for translation relative to the fixed conveyor. As the loading depth of material advances into the trailer, during material unloading for example, the movable conveyor is moved relative to the fixed conveyor thereby advancing the movable conveyor into the trailer. This helps to maintain the material-to-conveyor distance as the unloading or loading progresses.

Because these types of extendible conveyors comprise two or more conveyors, one atop the other, there is a step discontinuity at each transition between the upper flights of the conveyor belt surfaces of each conveyor. Material moving first along the fixed conveyor belt section, such as during material loading, must be moved from the lower fixed conveyor section to the upper movable conveyor section often by a manual lifting operation. This discontinuity may cause problems in the loading operation particularly with heavy objects. Material moving from the upper movable conveyor section down to the lower fixed conveyor section, during material unloading, may be subjected to jarring that may damage the material.

Portable conveyors comprising a fixed length conveyor section mounted for portability on casters or wheels have also been used for loading and unloading material into or from a trailer. As the material loading depth in the trailer changes, the portable conveyor's position can be changed to keep one end of the portable conveyor close to the material residing in the trailer. Because these types of portable conveyors are fixed length, the portable conveyor moves from a desired material destination as the portable conveyor is moved into or out of the trailer to accommodate the changing loading depth.

Extendible conveyors comprising telescoping booms and endless conveyor belts are also in use and avoid some of the problems associated with the previously described conveyor devices. These extendible conveyors comprise, generally, two or more nested boom sections which telescope relative to one another to provide an extendible conveyor boom. The nested boom sections fit within each adjacent boom section, each boom member being progressively smaller in width and height than the adjacent member with which it nests. One end of the conveyor, the base end, is usually fixed or is mounted on rollers so that the extendible conveyor is portable. The width of the most narrow boom section determines the maximum width of the belt supported by the conveyor.

Telescoping booms of these extendible conveyors are either cantilevered or have one or more supports provided at points along the length of the extended boom sections.

Where the extendible conveyors are cantilevered, the boom structure is typically mechanically massive to support the cantilevered weight. The mechanical structure of the cantilevered boom must be very strong to support the extending boom members at maximum extension and material loading with an acceptable vertical deflection. Also, the mechanical means for extending the nested boom sections, such as a telescoping hydraulic cylinder, are heavy and increase the cantilevered weight carried by the boom structure. Because of their mass and mechanical complexity, cantilevered extendible conveyors are often very expensive.

The mechanical requirements for the cantilevered boom usually result in a small ratio of the width of the narrowest of the extended boom members and the opposed base boom member. Where the extendible conveyor is very long, this ratio, which defines the maximum conveyor belt width, may be very small. Thus, the material handling capacity of cantilevered conveyors may be quite limited due to the narrow conveyor belts these booms carry. The width of the base member and the adjacent extending boom member may be so wide that personnel movement into and out of the trailer opening may be very limited or prevented. This may present a safety hazard and may prevent floor transport of large object into or from the trailer alongside the cantilevered telescoping conveyor.

The structural size and mass of the telescoping boom members can be significantly reduced by providing external supports for the extended boom members as the boom members are telescoped from the base member. Legs fitted with wheels for engaging a support surface may be attached to the extending members of one or all of the extended boom members. The wheels roll over the support surface as the boom members are caused to be extended.

These telescoping conveyors supported by external supports are typically extended by extension means such as telescoping hydraulic cylinders located coaxially within the nested boom members or motorized synchronized gearing. The extension means contribute substantially to the bulk of the mechanical structure comprising the boom members which results in a more massive mechanical structure having limited material moving capacity.

Extendible conveyors having telescoping boom members must be provided with means for taking-up excess conveyor belt length which results as the boom members are retracted from the fully extended position. The take-up means must also be capable of paying-out belting as the telescoping boom is extended. The take-up means may include take-up rollers mounted within each boom member. This take-up arrangement allows the excess belt length to be taken up within the boom member itself. This type of take-up has the short coming in that it contributes substantially to the overall weight of the boom sections because of the higher boom profile necessary to accommodate the taken-up portion of the belt and the associated rollers. The increased weight becomes significant with cantilevered telescoping booms. This take-up arrangement also tends to be mechanically complex and expensive to construct. Also, because portions of the conveyor belt reside within the conveyor boom member as well as the take-up mechanism itself, it may be difficult or impractical to locate control cables within the boom members. Consequently, the control cables may have to be located external to the boom members where they may become damaged. Because these cables are easily damaged, occupational safety codes often require that they be protected by armoring or other means to prevent damage or injury.

Other take-up devices for accumulating excess conveyor belt include those with moving roller assemblies having opposed rollers about which the conveyor belt is supported in a serpentine pattern. The rollers are caused to move relative to one another as the boom members are moved. The opposed rollers of these take-up devices are urged apart by springs or a combination of hydraulic cylinders acting against the belt tension and roller assembly weight. The roller assemblies may be arranged such that the belt runs substantially vertically between take-up rollers. Other arrangements cause the taken-up portion of the belt to run horizontally between the rollers.

As previously discussed, it is important to control the conveyor belt tension during material handling and boom extension or retraction. Proper tensioning extends the useful life of the conveyor belt and ensures traction of the belt with a driving roller associated with the extendible conveyor to prevent the conveyor belt from stalling. Take-up roller arrangements urged apart under the weight of the rollers themselves and by mechanical devices such as hydraulic cylinders may always apply at least a minimum tension which exceeds a desired tension in some applications.

What is needed and what is not available is an extendible conveyor having a compact extendible boom, which efficiently accumulates excess conveyor belt, has a high material handling capacity, is capable of being economically constructed and operated, and which will reliably transport material loaded under a wide range of operating conditions.

SUMMARY OF THE PRESENT INVENTION

The present invention solves the above described problems in the art by providing an extendible conveyor having a high material handling capacity under a wide range of material transporting conditions. The extendible conveyor of the present invention includes an extendible boom comprising nested boom members supported at the most extended end by a motorized, wheeled support which supports and extends the boom members. By supporting the extended end of the extendible boom a high belt-to-boom width ratio is realized which allows a wide conveyor belt to be used with the extendible conveyor. By driving the wheeled support to extend the conveyor boom the interior portion of the extendible boom members is available for running control cables that may otherwise be run external to the boom and be damaged during use.

The extendible conveyor also includes a belt take-up for taking-up or paying-out belting at a desired conveyor belt tension as the boom members are retracted or extended. Maintaining the conveyor belt at a desired tension extends the life of the conveyor belt and provides consistent and reliable material transporting operation. The belt take-up is controlled by a control arrangement responsive to the extended position of the boom members and the belt tension.

More particularly described, the apparatus of the present invention includes a material transporting apparatus for transporting material from a first location to a second location comprising an extendible boom. The extendible boom of the present invention includes a first end and a second end, the second end being extendible relative to the first end to permit the extended length of extendible boom to extend from a retracted length to an extended length. The extendible boom defines an upper support surface between the first end and the second end, and supports end rollers adjacent the first end and the second end. The extendible boom is supported at its first end by a pivot assembly and the second end is supported by the motorized boom support.

An endless conveyor belt having a predetermined belt length and defining an excess belt portion and an active belt portion is supported for rotation about the extendible boom at any extended length of the extendible boom. The conveyor belt presents an upwardly facing material support surface for carrying material placed on the conveyor belt support surface.

A belt take-up accumulates the excess portion of the endless conveyor belt. The belt take-up is coordinated with the movement of the extendible boom by a control arrangement that maintains the conveyor belt at a desired tension during boom extension and material transport. In a preferred embodiment of the present invention the belt take-up includes a pair of opposed roller assemblies, each roller assembly having at least one belt supporting roller. The roller assemblies are adapted for movement relative to each other. The excess portion of the conveyor belt is supported by the opposed rollers in a serpentine arrangement. By changing the distance between the roller assemblies the amount of excess conveyor belting taken-up by the belt take-up is changed.

In one embodiment of the present invention relative motion of the roller assemblies is provided by a jackscrew arrangement adapted to translate one roller assembly relative to the other roller assembly. A motor actuates the jackscrew arrangement in response to a controller which coordinates jackscrew movement with the extension and retraction of the extendible boom so that the desired belt tension is maintained.

The method of the present invention includes the steps of providing an extendible conveying apparatus, having an extendible boom and an excess belt take-up device, and coordinating the extension of the extendible boom with the belt take-up device. The extension of the boom member and belt take-up are preferably controlled to maintain a desired belt tension in the belt to extend the belt life and to provide reliable and consistent extendible conveyor operation.

Thus, it is an object of the present invention to provide an apparatus and method for conveying material from a first location to a second location.

It is a further object of the present invention to provide a conveyor and method for conveying material from a first location to a second location.

It is another object of the present invention to provide an extendible conveyor and method so that the material-to-conveyor distance may be maintained to facilitate conveying material.

It is another object of the present invention to provide an extendible conveyor having a belt take-up for taking-up excess conveyor belt while maintaining the conveyor belt at a desired belt tension.

It is a further object of the present invention to provide a telescoping conveyor having a high belt width-to-boom width ratio.

Other objects, advantages and features of the present invention will be more readily understood from the following detailed description of specific embodiments thereof when read in conjunction with the accompanying drawings.

DETAILED DESCRIPTION OF THE PREFERRED EMBODIMENT

Figure 1:
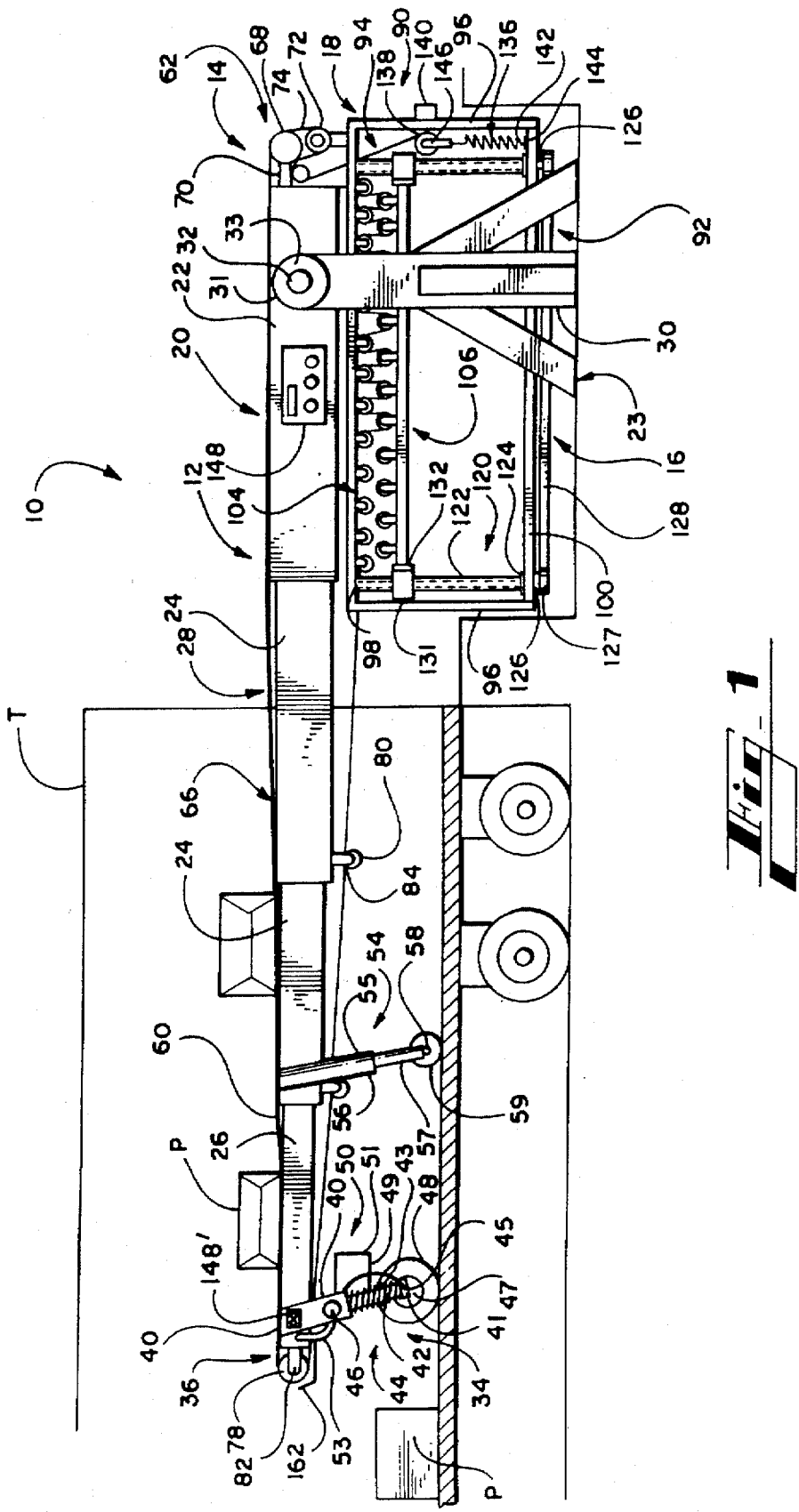
FIG. 1 is a side view of the extendible conveyor of the present invention in a fully extended configuration with portions located within a trailer.
Figure 2:
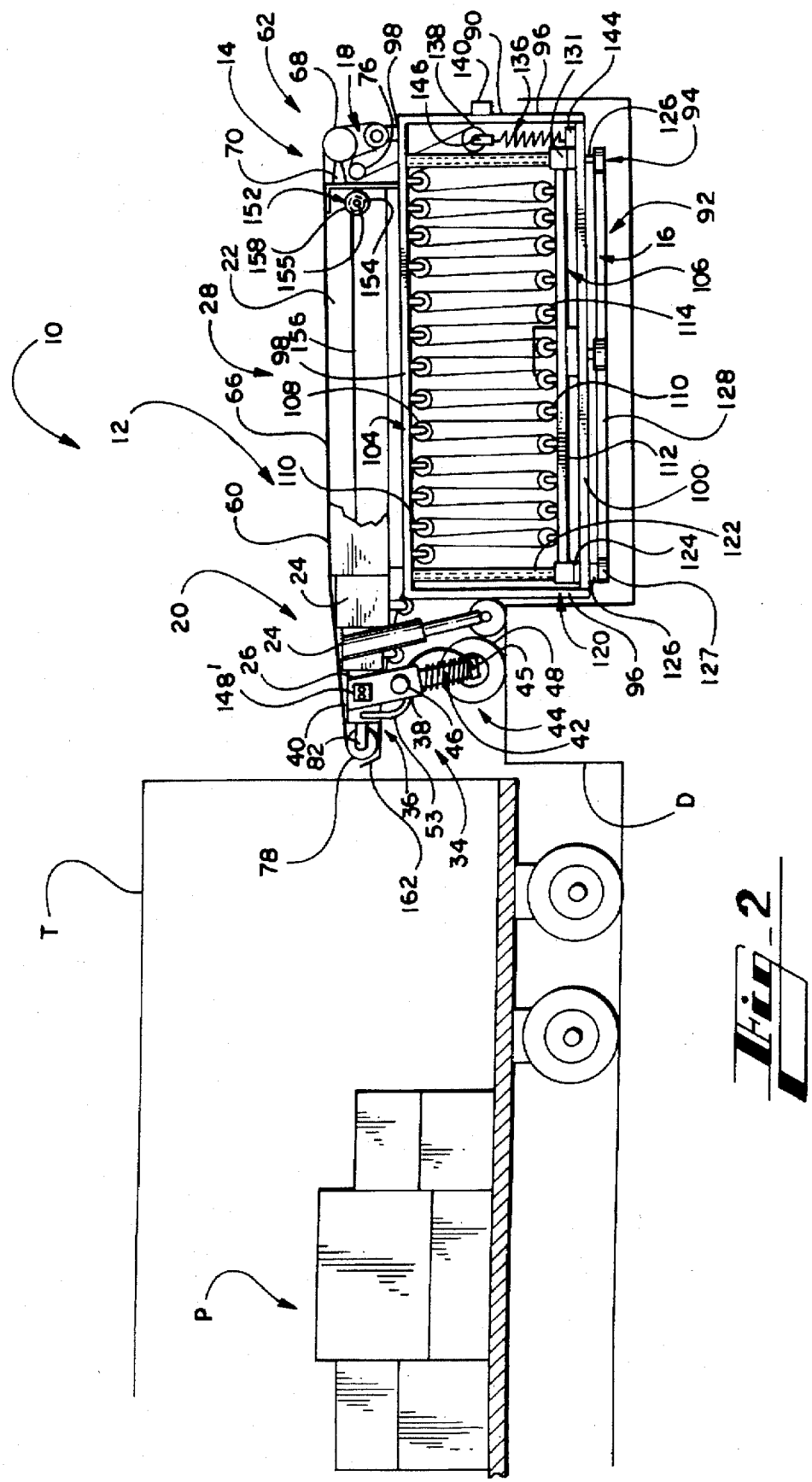
FIG. 2 is a side view of the extendible conveyor in a retracted configuration shown in partial cross-section and with portions of the pivotal support removed to more clearly show the lower roller assembly.

Referring now in more detail to the drawings, in which like numerals refer to like parts throughout the several views, FIGS. 1 and 2 show an extendible conveyor 10 having an extendible boom 12. In FIG. 1 the extendible conveyor 10 is shown in a fully extended configuration with portions residing in a trailer T containing packages P. The extendible conveyor 10 is shown in a fully retracted configuration in FIG. 2.

The extendible conveyor 10 comprises a telescoping boom 12, a conveyor belt and support assembly 14, a conveyor belt take-up assembly 16, a tension control assembly 18 and a conveyor controller arrangement 19. A pivot assembly 23, shown in FIGS. 1 and 4, supports the extendible conveyor 10 for pivotal movement in a vertical plane.

The telescoping boom 12 comprises a plurality of nested boom members including a stationary boom member 22, intermediate boom members 24 extending from the stationary boom member 22 and a distal boom member 26 extending from an intermediate boom member 24. The boom members 22, 24 and 26 are fabricated of tubular material, such as sheet metal, having a rectangular cross section. The exterior width and height dimensions of the boom members are sized to cooperate with the interior width and height dimensions of the boom member within which it nests so that the boom members 22, 24 and 26 telescope relative to one another. The boom members 22, 24 and 26 define a variable length belt support surface 28 along the upper surface of each of the boom members 22.

The pivot assembly 23 allows the extendible telescoping boom to accommodate variations in height of the beds of trailers T into which the boom 12 is extended, as well as variations in the height of stacked parcels within a trailer being loaded or unloaded. The pivot assembly 23 comprises opposed support stands 30 and pivot bearings 31 attached to the support stand 30. Each pivot bearing 31 includes a flange mounted horizontal pivot shaft 32 attached rigidly to a vertical side surface of the stationary boom member 22. The pivot shaft is journaled in a bearing block 33. The pivot assembly 23 is typically disposed in fixed engagement with the loading dock making the extendible conveyor 10 a stationary installation. In an alternative embodiment (not shown), casters and auxiliary securing anchors may be adapted to the pivot assembly 23 so that the telescoping conveyor 10 can be a portable device.

A motorized boom support 34 is attached in supporting engagement with a free end 36 of the distal boom member 26. The boom support 34 includes an extendible support frame 38 which cooperates with the pivot assembly 23 to pivot the telescoping boom 12 in a vertical plane. The support frame 38 includes a fixed frame 40 attached to outer surfaces of the distal boom member 26, and a telescoping frame 42 that mounts a drive assembly 44. The telescoping frame 42 mounts in sliding engagement with the fixed frame 40 and is moved relative to the fixed frame 40 by a pair of jackscrew elevating assemblies 41 adapted to opposed sides of the support frame 38. Each of the elevating assemblies 41 includes a jackscrew 43 secured for rotation at its lower end to the telescoping frame 42 by a flange 45. The upper end of the jackscrew threadedly engages a ball nut (not shown) fixedly mounted within and to the fixed frame 40. The jackscrew 43 is driven for rotation by a pivot motor 46 which is secured to the fixed frame 40. The pivot motor 46 is powered by a power cable 49 located within the interior of the telescoping boom 12. When the pivot motor 46 is caused to turn the jackscrew 43 moves relative to the ball nut and causes the telescoping frame 42 to move, relative to the fixed frame 40, either up or down depending on the direction of rotation of the pivot motor 46. Alternatively, the motorized boom support 34 may have a fixed height.

Figure 4:
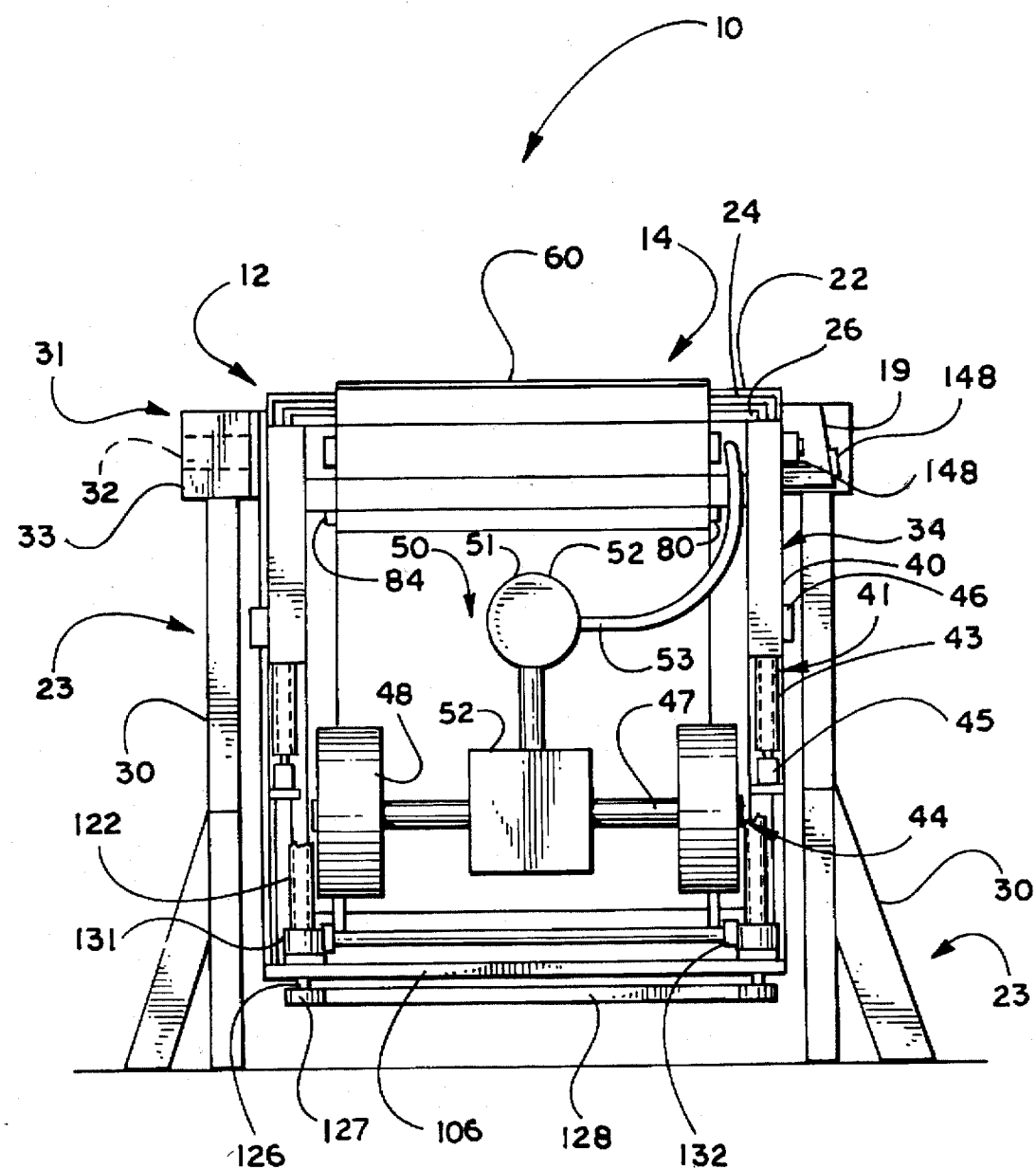
FIG. 4 is an end view of the extendible conveyor shown in FIG. 2.

As shown in FIG. 4, the drive assembly 44 includes an axle 47 which mounts a pair of wheels 48 for rotation about the axle 47. A power assembly 50, comprising a motor 51 operatively interconnected to the axle 47 through a gearbox 52. In an alternative embodiment of the present invention (not shown) the extendible conveyor may be configured for pivotable movement in a horizontal plane relative to the loading dock. In such a case the boom support 34 may be provided with a steering mechanism so that the telescoping boom 12 may be steered to enhance its use within the trailer T.

The motor 51, which in the preferred embodiment is an electric motor, is powered by an electrical power signal, through an electrical power and control cable 53 attached electrically to the motor 51. The electrical power and control cable 53 passes through the hollow interior of the boom members 22, 24 and 26. When the wheels 48 are disposed in engagement with a support surface, such as the bed of a trailer shown in FIG. 1, and are caused to rotate, the telescoping boom 12 retracts or extends depending on the direction of rotation of the wheels 48. In this way, the motorized boom support 34 not only supports the distal end of the boom 12 but also provides the means for extending or retracting the boom 12. Examples of powered drive wheel assemblies are shown in U.S. Pat. Nos. 3,885,682 and 3,006,454 referenced above. The extension of each boom member 22, 24 and 26 from its adjacent boom member is limited by cooperating stops (not shown) positioned on adjacent boom members in a known manner so that the boom members 22, 24 and 26 remain engaged with one another.

Because the boom 12 is supported at both ends, rather than being cantilevered, the construction of the boom 12 can be more compact and lighter in weight than the mechanical construction necessary for a fully cantilevered, telescoping boom. The light weight and compact construction is further enhanced due to conveyor belt accumulation occurring external to the telescoping boom in the belt take-up assembly 16. Additionally, the use of the motorized boom support 34 for extending the telescoping boom 12, rather than a telescoping hydraulic cylinder located within the telescoping boom, further reduces the weight and mechanical complexity of the boom 12. The interior passageway defined through the tubular boom members provides ample space for locating the control cables rather than locating them exteriorly to the boom 12 where the cables may become fouled or damaged.

The telescoping boom 12 may be provided with auxiliary wheeled supports 54 attached to the extending ends of one or more of the intermediate boom members 24. The auxiliary supports 54 support the telescoping boom 12 at intermediate positions along the length of the boom 12. Auxiliary supports are prescribed where the boom 12 is configured for long extensions or where heavy loads, which would cause excessive boom deflection along its length, are to be carried by the extendible conveyor 10. The auxiliary supports 54 may be a fixed height or an adjustable height. If the motorized boom support assembly 34 is provided with an extendible support frame 38 then the auxiliary supports 54 most likely be would be made adjustable similar to the motorized boom support assembly 34. If the motorized boom support assembly 34 is a fixed height then the auxiliary supports 54 may be fixed or may be provided with a spring mounting mechanism to allow the auxiliary support 54 to accommodate boom pivot.

Each auxiliary support 54 includes an auxiliary support frame 55 having its upper end 56 attached to an end of an intermediate boom 24. A lower end 57 of the support frame 55 mounts an axle 58. The axle 58 mounts a pair of spaced apart wheels 59, only one of which is shown in the figures.

The conveyor belt and support assembly 14 comprises an endless conveyor belt 60 supported for rotation about the telescoping boom 12 by a roller support assembly 62. The conveyor belt 60 is fabricated typically of a length of elastomer impregnated fabric having its opposed ends joined by a splice. The length of the belt 60 is determined by the overall extended length of the telescoping boom 12, plus belting necessary to turn about the several rollers (described in detail below) of the roller support assembly 62 and a residual portion of belting disposed within the conveyor belt take-up assembly 16 that will be explained in more detail below. In use, the belt 60 defines a variable length active region 66 which is supported generally by the upper belt support surface 28 of the boom members 22. The active region 66 is the material load carrying region of the belt and the length varies as the telescoping boom length is varied by extension or retraction of the telescoping boom 12. The remaining portion of the belt 60 is referred to as the excess region.

The roller support assembly 62 includes a drive roller 68 mounted for rotation adjacent the stationary boom member 22 by mounting flanges 70. The drive roller is rotated by a drive motor 72 through a drive chain or belt 74. An idler roller 76 forces the belt 60 into an angular engagement of about 220 degrees with the drive roller 68 so that the drive roller 68 does not slip relative to the belt 60. The roller support assembly 62 further includes an end roller 78 and a plurality of auxiliary support rollers 80. The end roller 78 is supported for rotation by roller flanges 82 mounted to the free end 36 of the distal boom member 26. The auxiliary support rollers 80 are disposed along the underside of the telescoping boom 12 and are attached to the intermediate boom members 24 by support roller flanges 84. The support rollers 80 support excess portions of the belt 60 as it passes over the end roller 78 and underneath the boom 12. The support rollers 80 are helpful when the boom 12 is fully extended to prevent the belt 60 from sagging and possibly stretching the belt 60.

The conveyor belt take up assembly 16 includes a support frame 90, a belt accumulator assembly 92 and an actuator assembly 94. The support frame 90 is supported by the telescoping boom 12, along a lower surface of the stationary boom member 22. The support frame 90 is supported at a height above the loading dock by the pivot assembly 23 sufficient to provide clearance to allow the intended angular deflection of the telescoping boom 12.

The support frame 90 includes upstanding side posts 96 attached to an upper rectangular horizontal plate 98 at each of four corners of the plate 98. The plate 98 provides a mounting surface for portions of the belt accumulator assembly 92 which is explained in more detail below. The upper plate 98 also provides the place of attachment of the telescoping boom 12 to the conveyor belt take-up assembly 16. The support frame 90 also includes a lower horizontal rectangular plate 100 supported above the loading dock D by the upstanding side posts 96 and the pivot assembly 23. The lower horizontal rectangular plate 100 provides structural support for portions of the accumulator and actuator assemblies, 90 and 94, respectively.

The belt accumulator assembly 92 includes an upper roller assembly 104 and a lower roller assembly 106. The upper roller assembly 104 includes a plurality of rollers 108 supported by the upper plate 98 through downwardly extending roller flanges 110. The lower roller assembly 106 includes a rectangular horizontally disposed roller support plate 112 which is supported for vertical translation by the actuator assembly 94. The roller support plate 112 mounts a plurality of lower rollers 114 through upwardly extending roller flanges 110.

Figure 3:
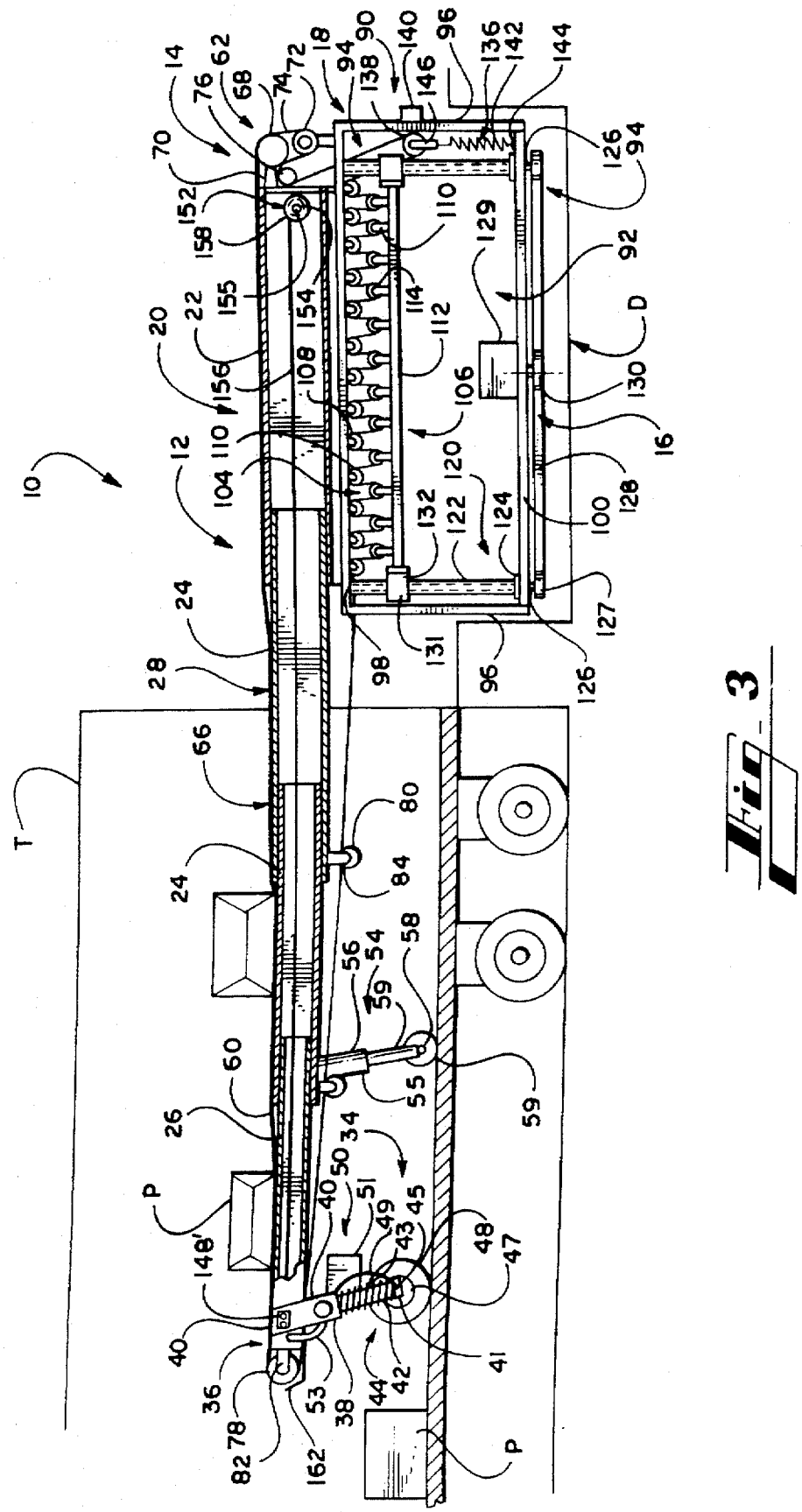
FIG. 3 is a side view of the extendible conveyor of FIG. 1 shown in partial cross section with portions of the pivotal support removed to more clearly show the lower roller assembly and drive arrangement.

The upper rollers 108 and the lower rollers 114 are supported in spaced apart relation to adjacent rollers on the support plates 98 and 112, respectively. The relative position of the upper rollers 108 to the lower rollers 114 is staggered along the longitudinal axis of the conveyor such that the lower rollers 108 are positioned within a projection of the space separating the upper rollers 112, and vice-versa, as is shown in FIGS. 1–3.

The actuator assembly 94 includes four ball screw assemblies 120 supported for rotation between the upper and lower support plates 98 and 100 adjacent each of the corners of the support frame 90. Each ball screw assembly includes an elongated vertical screw 122 having a helical, circular form thread along a substantial portion of its length. Alternatively, the screw may be provided with other types of helical thread profiles such as an acme thread profile, for example. The upper end of the screw 122 is supported for rotation by a bushing arrangement adapted to the upper plate 98. The lower end of the screw is supported by a thrust bearing 124. An axial stem 126 extends from the lower end of the screw 122 and mounts a sprocket 127. The sprocket may be a chain sprocket for engaging a roller chain or a cleated belt sprocket for engaging a cleated timing belt. Where the sprocket 127 is a cleated belt sprocket a cleated belt 128 drivingly interconnects the each of the sprockets 127 so that the screws 122 can be rotated synchronously. The cleated belt 128 is driven by a servo motor 129 which mounts a drive sprocket 130.

Different types of motors may be adapted for use as the actuator motor 129. For example, the servo motor 129 may be of a conventional design powered by an AC or DC power signal, or the servo motor 129 could be a stepper motor.

An actuator nut 131 is threadedly disposed about each of the screws 122. Where the screw 122 is provided with a helical, circular form helical thread a recirculating ball nut may be used to translate the rotary motion of the screw 122 to linear motion of the nut 131. If the screw 122 is provided with another profile, an acme thread as discussed above, the actuator nut 131 must be provided with a complimentary profile. Recirculating ball screws are low friction, high precision actuators. Recirculating ball nuts used with circular form screws are particularly useful for transmitting high loads that are required to be reversed.

Each of the actuator nuts 131 is attached adjacent the corners of the roller support plate 112 through mounting flanges 132. By actuating the motor 129 the screws 122 are caused to rotate simultaneously which causes the roller support plate 112 to translate toward, or away from, the upper roller assembly 104 depending on the direction of rotation of the servo motor 129.

The excess portion of the belt 60 is disposed about the upper and lower rollers 108 and 114, respectively, in a serpentine pattern. The maximum take-up length of belt 60 is calculated by determining the overall traverse distance of the lower plate 112 between its upper and lower most points multiplication. The traverse distance is multiplied by the number of vertical conveyor belt flights extending from the upper rollers 108 to the lower rollers 114. This cumulative take-up length is approximately equal to two times the differential extension length of the telescoping boom 12.

Tension in the conveyor belt 60 must be maintained at a predetermined level to ensure that the belt 60 does not buckle or stall. It is also important to maintain the belt 60 at a desired low tension, sufficient to prevent the above referenced problems, so that the useful life of the belt 60 will be realized. If the belt is maintained at high tension, the conveyor belt life will be substantially limited. Also, at high belt tension, the belt 60 may stretch thereby increasing its length. Excessive stretching of the belt may increase the belt length such that the take-up length necessary to maintain the tension may exceed the length of belt capable of being taken-up in the belt take-up 16.

Tension in the conveyor belt 60 is maintained by the tension control system 18 which includes a tension roller 138 supported yieldably by a spring mechanism 136. The spring mechanism 136 includes a plurality of tension springs 142 (only one of which is shown in the drawings) spaced along the roller 138. The springs 142 are supported at one end by a mounting fixture 144 attached to the lower plate 100 and engaged at their opposing ends with a roller bracket 146. The roller bracket 146 supports both ends of the tension roller 138 for rotation in a horizontal plane. The spring mechanism 136 allows the tension roller to translate vertically to maintain a desired tension in the conveyor belt 60.

For fine-tuning the tension in the conveyor belt 60 the vertical position of the tension roller 138 optionally may be measured by a position sensor 140 which interfaces electrically with the extendible conveyor controller 19. The position sensor 140 may comprise, for example, an optical sensor system, a rotary encoder adapted to translate vertical linear motion of the tension roller 138 into rotary motion for rotating a shaft of the rotary encoder, or other linear position sensors such as a linear variable differential transformer (LVDT) having its armature fixed relative to the roller bracket 146 and its coil fixed relative to the lower plate 100. The position sensor 140 indicates the extension dimension of the tension springs 142 which, at a known spring constant, K, indicates the force being applied by the tension roller 138 to the conveyor belt 60 which passes around the tension roller 138.

The extendible conveyor controller 19 includes an operator control enclosure 148, a servo-control circuit (not shown), located within the control enclosure 148 and a boom extension sensor 152. Appropriate switching for controlling the pivot motor 46 is located in the operator control enclosure 148.

In the preferred embodiment the extension sensor 152 includes a rotary encoder transducer 154 which is adapted to convert linear motion into rotary motion, and an actuator line 156. Other sensor arrangements capable of providing a means for indicating the extension length of the extendible conveyor boom 12 are within the contemplation of the present invention and may be adapted for use with the extendible conveyor 10.

The rotary encoder 154 includes a shaft 155 to which is mounted a spring loaded drum 158. The actuator line 156 is attached, at one end, to the spring loaded drum 158 and at the opposing end, to the distal boom member 26. The actuator line 156 is coiled about the drum 158. As the telescoping boom 12 is extended, the drum 158 rotates as the actuator line 156 pays out from the drum 158. The actuator line 156 is retrieved by recoiling it onto the drum 158 as the telescoping boom 12 is retracted. The spring loading of the drum 158 retrieves the actuator line 156 and reverses the direction of rotation of the encoder shaft 155. In the preferred embodiment of the present invention the rotary encoder 154 provides an absolute output signal indicative of shaft angular displacement and shaft rotation direction, that is, whether the shaft 155 is rotated clockwise or counter clockwise. Thus, the absolute output signal of the rotary encoder 154 provides information indicative of boom extension length and whether the boom is being retracted or extended. The angular direction information is necessary for causing the servo motor 129 to rotate in the proper direction so that the lower roller assembly 106 translates upwardly when the boom 12 is extended and translates downwardly as the boom 12 is retracted.

The operator control enclosure 148 includes a complement of switches and controls for controlling the operation of the extendible conveyor 10. The controls include, for example, a power switch for turning the power control to the conveyor 10 on and off, an extension controller for extending and retracting the conveyor boom 12, a switch for controlling the pivot motor 46, a belt linear speed control switch, a readout for providing a visual display of the belt speed and boom extension length, a control switch and an emergency stop switch.

Control of the operation of the conveyor 10 may be provided at several positions on the conveyor 10. For example, where the control enclosure 148 is located on the stationary boom member 22, an auxiliary control enclosure 148', provided with a complement of redundant control switches, may be located adjacent the free end 36 of the distal boom member 26. The auxiliary control enclosure 148' provides operator control for personnel located inside the trailer T.

The servo-control circuit, which may be, for example, a programmable logic controller (PLC) or a microcomputer, controls the electrical signals which control the extension of the boom 12, the belt tension and the belt speed. The control circuit receives, as input signals, a boom extension signal from the extension sensor 152, a belt tension signal from the tension position sensor 140 (if present) and control signals from the control enclosure 148. The control circuit provides, as output signals, a motor control signal for the motorized boom support assembly motor 51 and a servo motor control signal for controlling the servo motor 129 of the belt take-up assembly 16. The control circuit may also incorporate control functions of the pivot motor 46 to cause the pivot motor 46 to be operatively interrelated with boom extension and belt tension control.

One or more collision sensors 162 may be provided to enhance the operational safety of and to prevent damage to the conveyor 10 during use. The collision sensors 162, which are electrically interfaced with the control circuit, are provided adjacent the free end 36 of the distal boom member 26 to sense the presence of personal working in the trailer T, loaded material or impeding structures that the boom 12 or boom support assembly 34 may contact upon further boom extension. If the collision sensors 162 sense a person, material or structure during boom extension, typically by lightly striking the person, material or structure, the collision sensor 162 is actuated and causes the extension of the boom 12 to cease. Ultrasonic, optical or other noncontact sensors may also be adapted for use in a collision sensor 162 to avoid the need to have actual contact with the person, material or structure to actuate the collision sensor and stop the boom extension.

Operation of the Extendible Conveyor

The conveyor boom 12 is extended by actuating the extension control switch on the operator control enclosure 148. The control circuit sends a control signal that energizes the motor 51 of the boom support assembly 34 which commences the extension of the telescoping boom 12. The wheels 48, initially supported on portions of the loading dock D move into the trailer opening and into support with the trailer bed. Preferably, the boom members 24 and 26 extend serially such that one boom member does not begin to extend until another boom member has fully extended. Alternatively, the boom members 24 and 26 may extend uniformly as the telescoping boom 12 is extended.

The control circuit, which receives output signals from the encoder 154 (and the tension roller position sensor 140 if provided) coordinates the extension of the telescoping boom 12 with the movement of the lower roller assembly 106 of the take-up assembly 16. Thus, as the telescoping boom 12 extends the actuator line 156 travels with the extending boom member 26 and pays-out from the drum 156 which rotates the encoder shaft 155 sending an output signal to the control circuit.

At the same time, the conveyor belt tightens between the rollers 108 and 114 of the take-up assembly 16 and causes the tension roller 138 to travel upwards. In response to the signal output from the rotary encoder 154 an actuation signal, which is proportional to the measured boom movement by the encoder 154, is sent to the servo motor 129. The servo motor 129 rotate the screws 122 causing the actuator nuts 131 to rise along the screws 122 thereby lifting the lower roller assembly 106. As the lower roller assembly 106 rises, the distance between the upper rollers 108 and the lower rollers 114 decreases resulting in excess conveyor belt 60 being payed-out of the belt take-up assembly 16. The tension roller 138 takes up any slack still remaining at a desired tension established by the springs 136.

During or after the extension or retraction of the telescoping boom 12 the telescoping boom may be pivoted by actuating the pivot motor control switch at the control enclosure 148 or 148'. Typically this would be done after boom extension is ceased. The height of the telescoping boom 12 is adjusted to accommodate the loading height of the packages P in the trailer T or to accommodate the height of the floor of the trailer T which may vary from trailer-to-trailer. Thus, if packages are being loaded and stacked close to the ceiling of the trailer T the loading personnel may adjust the distal end 36 of the telescoping boom 12 closer to the ceiling. With the distal end 36 close to the ceiling of the trailer T the distance the loading personnel have to physically move the package when moving it from the conveyor belt 60 to the package stacks is minimized. This not only saves time but also provides for greater safety while loading and unloading the trailer T because personnel need not have to bend over or reach excessively while loading or unloading packages P.

Retraction of the telescoping boom 12 is similar to boom extension. To retract the telescoping boom 12, a retraction control switch on the operator control enclosure 148 is actuated sending a control signal to the motor 51 of the boom support assembly 34 to rotate in the direction opposite the extension direction. As the boom 12 begins to retract, the actuator line 156 rewinds onto the spring loaded drum causing the rotary encoder shaft to rotate opposite to the direction of shaft rotation when the boom 12 is extended. The actuation signal sent to the motor 129 causes the motor 129 to rotate the screws 122 oppositely so that the lower roller assembly descends along the screws 122 thus taking-up excess conveyor belt 60 resulting from retracting the telescoping boom 12.

The ways in which the feedback control between the encoder signal and the motor 129 control may be implemented are well known. For example, each count of the encoder output upon boom 12 movement may cause a proportional number of steps of the motor 129 in an appropriate direction. Or the control circuit may include a table in memory relating the desired position of the lower roller assembly 106 for each boom position, and the motor 129 may be controlled to move there.

In addition to the manual control switches provided on the control enclosure 148, voice actuated controls may be provided to allow the operator to move the conveyor 10 while both hands are occupied or when the operator is not conveniently positioned to manipulate manual controls.

Where the extendible conveyor 10 is provided with a tension roller position sensor 140, the output signal of the tension roller position sensor 140 may be used to fine tune the conveyor belt tension. Fine tuning the belt tension may be desirable to accommodate belt stretching or the effect of high material loads on the conveyor belt 60. In this alternative embodiment of the extendible conveyor 10 the actuation signal responsive to the rotary encoder 154 output signal is a nominal control signal for actuating the motor 129. The magnitude of the nominal control signal is modified by the tension roller position indicator signal, in the control circuit.

Excess tension or tension below a desired limit is detected in the conveyor belt 60 by the movement of the tension roller 138 past predetermined vertical limits. The movement is measured by the tension roller position sensor 140. Excess belt tension may be caused by paying-out less excess conveyor belt 60 from the conveyor belt take-up assembly 16 than is required for a given extension of the telescoping boom 12. Tension below the desired limit may be caused by paying-out more excess conveyor belt 60 from the conveyor belt take-up assembly 16 than is required for a given extension of the telescoping boom 12. The consequence of excessive belt tension is reduced belt life. The consequence of belt tension lower than a desired limit may be stalling due to slipping between the drive roller 68 and the belt 60.

In the case of excess belt tension, the output signal of the tension roller position sensor 140 is processed by the control circuit and, in response, the control circuit slightly increases the actuation signal to the servo motor 129. The increased actuation signal to the servo motor 129 causes the belt take-up assembly 16 to pay-out excess conveyor belt 60 more quickly until the belt tension reaches the desired level. Where the tension is below a desired limit the control circuit slightly decreases the actuation signal to the servo motor 129 which causes the belt take-up assembly 16 to pay-out excess conveyor belt 60 less quickly until the belt tension reaches the desired level.

While the present invention in its various aspects has been described in detail with regard to preferred embodiments thereof, it should be understood that variations, modifications and enhancements can be made to the disclosed apparatus and procedures without departing from the spirit and scope of the present invention as defined in the appended claims.

What is claimed is:

1. A material transporting apparatus for transporting material from a first location to a second location, said apparatus comprising:

an extendible boom having a first end and a second end wherein said second end is extendible relative to said first end to permit the length of said extendible boom to vary from a retracted length to an extended length, said boom defining an upper support surface between said first end and said second end, and end rollers supported by said extendible boom at said first end and said second end;

an endless conveyor belt having a predetermined belt length and defining an excess belt portion and an active belt portion, said active belt portion supported by and adapted to move longitudinally along said upper support surface of said extendible boom about said end rollers at any extended length of said extendible boom, said conveyor belt presenting an upwardly facing material support surface for carrying material placed thereon;

a belt take-up for accumulating said excess belt portion of said endless conveyor belt;

a sensor outputting a signal representative of boom extension or retraction; and a controller responsive to said signal for operating said belt take-up to accumulate or release a length of conveyor belt corresponding to boom movement.

2. The apparatus of claim 1, wherein said extendible boom comprises two or more tubular boom members disposed longitudinally in nested engagement with one another such that said extendible boom extends telescopically, one of said tubular boom members comprising said extendible second end and another of said tubular boom members comprising said first end.

3. The apparatus of claim 1, wherein said belt take-up is further characterized by:

a first roller assembly and a second roller assembly, said roller assemblies being moveable relative to one another and located outside said extendible boom; and wherein said first roller assembly comprises at least one belt take-up roller supported for axial rotation, and said second roller assembly comprises at least one belt take-up roller supported for axial rotation, said excess portion of said conveyor belt being engaged alternately with said belt take-up rollers of said first and second roller assemblies and supported thereby, such that as said extended length of said extendible boom is changed said belt take-up rollers are caused to move relative to each other so that said excess portion of said conveyor belt is taken up by said belt take-up.

4. The apparatus of claim 3, wherein said first roller assembly is fixed relative to said extendible boom and said second roller assembly is translatable relative to said first roller assembly; and wherein said apparatus further comprises translation means adapted to said second roller assembly for causing said second roller assembly to move relative to said first roller assembly thereby causing said rollers supported by said first and second roller assemblies to move relative to one another.

5. The apparatus of claim 3, further characterized by a control circuit, said control circuit being adapted to coordinate the extension of said telescoping boom with the movement of said first roller assembly with respect to said second roller assembly so that as said extended length of said extendible boom is changed said roller assemblies move relative one another to change the length of said excess portion of said conveyer belt take-up and maintain said conveyor at a predetermined conveyor belt tension.

6. The apparatus of claim 4, wherein said translation means comprises at least one jackscrew operatively associated with said second roller assembly for causing said second roller assembly to move relative to said first roller assembly.

7. The apparatus of claim 1, further comprising:

a drive roller engaged with said conveyor belt for causing said conveyor belt to be rotated about said extendible boom; and a power source adapted to said drive roller for driving said drive roller to cause said belt to rotate.

8. The apparatus of claim 1, further comprising a driven boom support for supporting said boom adjacent said second end and for extending said second boom end relative to said first boom end, said driven boom support comprising a support frame in supporting engagement with said boom, at least one wheel supported for rotation by said support frame and adapted to engage a support surface over which said extendible boom is extended, and a motor operatively interconnected to said wheel to cause said wheel to rotate thereby causing said extendible boom to extend or retract.

9. The apparatus of claim 8, further comprising a pivot assembly supporting said material transporting apparatus for pivotal rotation in a vertical plane.

10. The apparatus of claim 9, wherein said driven boom support is an extendible driven boom support which is extendible in height and capable of raising or lowering said second end of said extendible boom relative to said first end, and wherein said extendible driven boom support cooperates with said pivot assembly to allow said extendible boom to be pivotally rotated in a vertical plane.

11. The apparatus of claim 1, further comprising
a tension roller that said conveyor belt extends partially around;
a mechanism yieldably supporting said tension roller to tension of said conveyor belt such that said tension roller moves in response to changes in the tension of said conveyor belt; and
a second sensor outputting a second signal representative of tension roller movement, wherein said controller is further responsive to said second signal of said second sensor for operating said belt take-up to accumulate or release a length of conveyor belt corresponding to tension roller movement.

12. A method of transporting material from a material source to a destination spaced apart from the material source wherein the distance between the material source and the destination is changeable, said method comprising the steps of:
providing an extendible conveying apparatus comprising an extendible boom having a first boom end and a second boom end, wherein the first boom end is extendible relative to the second boom end, an endless conveyor belt supported for rotation about the first and second boom ends, the endless conveyor belt defining an active portion and an excess portion, and a belt take-up for accumulating or releasing the excess portion of the conveyor belt,
loading material located at the material source onto the active portion of the conveyor belt of the conveying apparatus to transport the material to a destination,
extending or retracting the extendible boom to maintain the first and second boom ends adjacent the material source and the destination;
monitoring boom movement with a boom movement sensor having an output signal; and
responsive to the output signal of the boom movement sensor, accumulating or releasing a length of excess conveyor belt corresponding to the extendible boom movement.

13. The method of claim 12 further including the step of providing a motorized conveyor support adjacent the first boom end of the extendible boom for extending or retracting the extendible boom and for supporting the first boom end of the extendible boom.

14. The method of claim 13 further including the steps of:
providing a boom movement sensor outputting a signal representative of extendible boom extension or retraction;
providing a controller for controlling the belt take-up which is responsive to the signal representative of the extendible boom extension or retraction; and
accumulating or releasing excess conveyor belt corresponding to the extendible boom movement in response to the signal of the output sensor.

15. The method of claim 13 further including the step of pivotally supporting the extendible boom adjacent the first boom end for pivotal movement of the extendible boom in a vertical plane.

16. The method of claim 15 wherein the motorized conveyor support is height adjustable and further including the step of causing the extendible boom to pivot by changing the height of the motorized conveyor.

17. A material transporting apparatus for transporting material from a first location to a second location, comprising:
an extendible boom having a first end and a second end extendible relative to said first end to permit the length of said extendible boom to vary from a reacted length to an extended length, said boom defining an upper support surface between said first end and said second end and comprising end rollers supported by said extendible boom at said first end and said second end;
an endless conveyor belt having a predetermined belt length and defining an excess belt portion and an active belt portion, said active belt portion supported by and adapted to move longitudinally along said upper support surface of said extendible boom about said end rollers at any extended length of said extendible boom, said conveyor belt presenting an upwardly facing material support surface for carrying material placed thereon;
a belt take-up for accumulating said excess belt portion of said endless conveyor belt;
a sensor outputting a signal representative of conveyor belt tension; and
a controller responsive to said signal for operating said belt take-up to accumulate or release a length of conveyor belt corresponding to conveyor belt tension.

18. The apparatus of claim 17, further comprising:
a tension roller that said conveyor belt extends partially around; and
a mechanism yieldably supporting said tension roller to tension said conveyor belt such that said tension roller moves in response to changes in the tension of said conveyor belt,
wherein said sensor outputs a signal representative of tension roller movement, and
wherein said controller is responsive to said signal to accumulate or release a length of conveyor belt corresponding to tension roller movement.

19. The apparatus of claim 17,
wherein said belt take-up comprises a first roller assembly and a second roller assembly located outside said extendible boom, said second roller assembly translatable relative to said first roller assembly,
wherein, said first roller assembly comprises at least one belt take-up roller supported for axial rotation, and said second roller assembly comprises at least one belt take-up roller supported for axial rotation, said excess portion of said conveyor belt being engaged alternately with said belt take-up rollers of said first and second roller assemblies and supported thereby, such that as said extended length of said extendible boom is changed said belt take-up rollers are caused to move relative to each other so that said excess portion of said conveyor belt is taken up by said belt take-up, and
wherein said belt take-up further comprises at least one jackscrew adapted to said second roller assembly for causing said second roller assembly to move relative to said first roller assembly thereby causing said rollers supported by said first and second roller assemblies to move relative to one another, wherein said controller is responsive to said signal for rotating said jackscrew to accumulate or release a length of conveyor belt corresponding to conveyor belt tension.

20. A method of transporting material from a material source to a destination spaced apart from the material source wherein the distance between the material source and the destination is changeable, comprising the steps of:

providing an extendible conveying apparatus comprising an extendible boom having a first boom end and a second boom end, wherein the first boom end is extendible relative to the second boom end, an endless conveyor belt supported for rotation about the first and second boom ends, the endless conveyor belt defining an active portion and an excess portion, and a belt take-up for accumulating or releasing the excess portion of the conveyor belt;

loading material located at the material source onto the active portion of the conveyor belt of the conveying apparatus to transport the material to a destination;

extending or retracting the extendible boom to maintain the first and second boom ends adjacent the material source and the destination;

monitoring conveyor belt tension with a sensor outputting a signal representative of conveyor belt tension; and responsive to the output signal of the sensor, accumulating or releasing a length of conveyor belt in or from the belt take-up corresponding to conveyor belt tension.

21. The method of claim 20 wherein the step of extending or retracting the extendible boom is characterized by operating a motorized conveyor support adjacent the first boom end of the extendible boom for extending or retracting the extendible boom and for supporting the first boom end of the extendible boom.

22. The method of claim 20 wherein the steps of monitoring conveyor belt tension and accumulating or releasing excess conveyor belt are characterized by:

directing the conveyor belt at least partially around a yieldably supported tension roller that moves in response to changes in the tension of the conveyor belt;

monitoring the movement of the tension roller with the sensor, wherein the signal output by the sensor is representative of the movement of the tension roller; and responsive to the output signal of the sensor, accumulating or releasing a length of excess conveyor belt in or from the belt take-up corresponding to movement of the tension roller.

* * * * *